US009233751B2

(12) United States Patent
Metzler

(10) Patent No.: US 9,233,751 B2
(45) Date of Patent: Jan. 12, 2016

(54) GEODETIC MARKING SYSTEM FOR MARKING TARGET POINTS

(75) Inventor: Bernhard Metzler, Dornbirn (AT)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 100 days.

(21) Appl. No.: 14/008,519

(22) PCT Filed: Apr. 13, 2012

(86) PCT No.: PCT/EP2012/056757
§ 371 (c)(1),
(2), (4) Date: Oct. 30, 2013

(87) PCT Pub. No.: WO2012/140188
PCT Pub. Date: Oct. 18, 2012

(65) Prior Publication Data
US 2014/0163775 A1    Jun. 12, 2014

(30) Foreign Application Priority Data
Apr. 14, 2011    (EP) .................................... 11162509

(51) Int. Cl.
*B64C 19/00* (2006.01)
*G01C 15/00* (2006.01)
(Continued)

(52) U.S. Cl.
CPC .............. *B64C 19/00* (2013.01); *G01C 15/002* (2013.01); *G01S 19/07* (2013.01); *G01S 19/11* (2013.01); *G01S 19/51* (2013.01); *G05D 1/102* (2013.01); *B64C 2201/123* (2013.01)

(58) Field of Classification Search
CPC .............................. G01C 15/002; B64C 19/00
USPC .......... 701/2, 3; 382/154, 103; 356/614, 5.01, 356/141.1; 348/135, 144; 342/386
See application file for complete search history.

(56) References Cited

U.S. PATENT DOCUMENTS 6,836,285 B1 * 12/2004 Lubard ................. G01S 7/4802
                                                            348/31
6,955,324 B2 * 10/2005 Tanielian .............. B64C 39/024
                                                            244/3.13
(Continued)

FOREIGN PATENT DOCUMENTS

DE    19710722    10/1997
DE    19726706    1/1999
(Continued)

OTHER PUBLICATIONS

European Search Report dated Sep. 8, 2011 as received in Application No. EP 11 16 2509.

*Primary Examiner* — Thomas G Black
*Assistant Examiner* — Wae Louie
(74) *Attorney, Agent, or Firm* — Maschoff Brennan

(57) ABSTRACT

A geodetic marking system for marking a known target point, having an automotive, unmanned, remotely controllable air vehicle and having a geodetic position determination arrangement for determining the external actual position of the air vehicle. The air vehicle also has a marking unit for marking the target point, and the marking system has a control unit such that the air vehicle can be positioned relative to the target point position on the basis of the external actual position, which can be determined continuously. The control unit is also configured in such a manner that it is possible to control the marking unit for marking the target point taking into account the actual position, the desired position and a defined marking direction from the marking unit to the target point, with the result that the target point can be marked with geodetic accuracy in the defined marking direction.

37 Claims, 6 Drawing Sheets

(51) Int. Cl.
*G01S 19/07* (2010.01)
*G01S 19/11* (2010.01)
*G01S 19/51* (2010.01)
*G05D 1/10* (2006.01)

(56) References Cited

U.S. PATENT DOCUMENTS

| | | | | |
|---|---|---|---|---|
| 7,222,021 | B2 * | 5/2007 | Ootomo | G01C 15/00 348/36 |
| 7,990,550 | B2 * | 8/2011 | Aebischer | G01S 17/42 356/139.03 |
| 8,345,047 | B2 * | 1/2013 | Sanchez | E02F 9/26 345/440 |
| 2004/0021852 | A1 * | 2/2004 | DeFlumere | F41G 7/008 356/141.1 |
| 2004/0141170 | A1 * | 7/2004 | Jamieson | G01S 7/4811 356/5.01 |
| 2004/0264762 | A1 * | 12/2004 | Mas | G06K 9/00664 382/154 |
| 2004/0264763 | A1 * | 12/2004 | Mas | G01C 23/00 382/154 |
| 2006/0023204 | A1 * | 2/2006 | Filep | F41G 3/02 356/139.01 |
| 2010/0315290 | A1 * | 12/2010 | Grabbe | G01S 5/12 342/386 |
| 2012/0314068 | A1 * | 12/2012 | Schultz | G06T 1/0007 348/144 |
| 2013/0278631 | A1 * | 10/2013 | Border | G02B 27/017 345/633 |
| 2014/0032021 | A1 * | 1/2014 | Metzler | G01S 5/0036 701/3 |
| 2014/0163775 | A1 * | 6/2014 | Metzler | G01C 15/002 701/2 |
| 2014/0348388 | A1 * | 11/2014 | Metzler | H04N 5/00 382/103 |
| 2015/0022640 | A1 * | 1/2015 | Metzler | G01F 17/00 348/46 |
| 2015/0042790 | A1 * | 2/2015 | Hinderling | G01C 3/08 348/135 |

FOREIGN PATENT DOCUMENTS

| | | |
|---|---|---|
| DE | 19949580 | 4/2000 |
| EP | 1066497 | 1/2001 |
| EP | 1293755 | 3/2003 |
| EP | 1686350 | 8/2006 |
| EP | 1 703 300 A1 | 9/2006 |
| EP | 2431708 | 3/2012 |
| WO | 2006/097408 | 9/2006 |
| WO | 2008/038960 A1 | 4/2008 |
| WO | 2008/124713 A2 | 10/2008 |
| WO | 2008/138507 | 11/2008 |

* cited by examiner

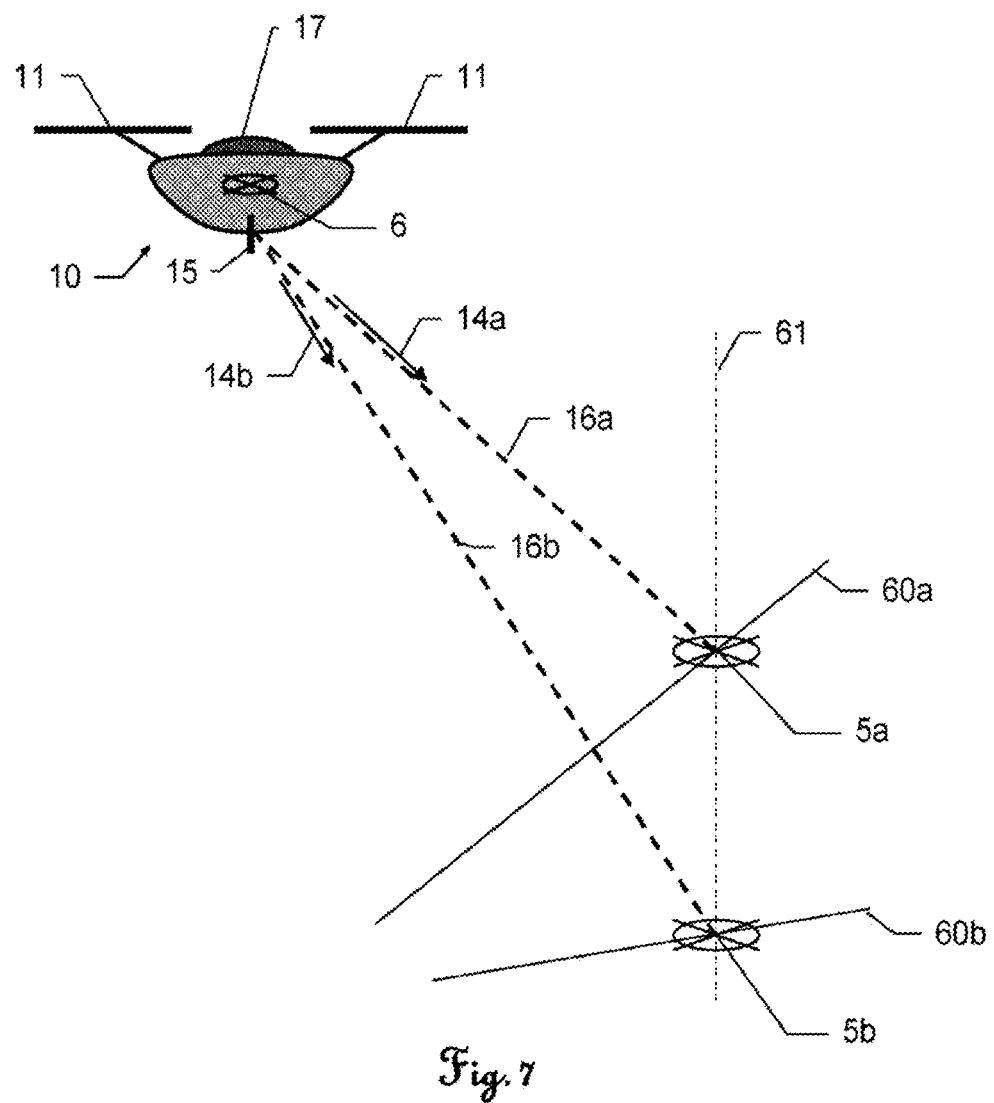

GEODETIC MARKING SYSTEM FOR MARKING TARGET POINTS

FIELD OF THE INVENTION

The invention relates to a geodetic marking system having a position determination arrangement, in particular a theodolite, a total station, or a GNSS system, in particular having a GNSS reference station, and having an automotive air vehicle for marking a known target point, a method for controlling a marking procedure using a marking system according to the invention, an automotive air vehicle for a marking system according to the invention, and a marking arrangement for a marking system according to the invention.

BACKGROUND

Numerous geodetic surveying devices have been known since antiquity for measuring one or in particular a plurality of target points. The distance and direction or angle from a measuring device to the target point to be measured are recorded as spatial standard data and also in particular the absolute position of the measuring device is detected in addition to any existing reference points.

Generally known examples of such geodetic surveying devices are represented by a theodolite, tachymeters, and a total station, which are also designated as electronic tachymeter or computer tachymeter. A geodetic measuring device of the prior art is described, for example, in published application EP 1 686 350. Such devices have electro-sensory angle and distance measuring functions, which permit a determination of the direction and distance to a selected target. The angle or distance dimensions are ascertained in the interior reference system of the device and must possibly still be linked to an external reference system for an absolute position determination.

In many geodetic applications, points are surveyed by placing specially designed target objects thereon. These typically consist of a plumb stick having a targetable module, for example, a reflector for defining the measurement section or the measurement point. These target objects are targeted by means of a surveying device, a direction and a distance to the objects are determined, and a position of the objects is thus derived.

Similarly to this point measurement, marking of already known target points or of points, the position of which was defined prior to a marking procedure, can be performed. In contrast to the point measurement, in this case, the position or the coordinates of the points to be marked are known and are to be marked. For such a marking procedure, a plumb stick or a surveying rod is conventionally also used, which rod is carried by a user and positioned on a target point. For this purpose, the user can move toward the target position of the target point based on position information generated by the surveying device, wherein the surveying rod is automatically targeted by the surveying device by a second person or by an automatic mechanism assigned to the surveying device. If the target point has been reached, the user can perform a marking of the point.

Modern surveying devices such as a total station for such marking and surveying tasks have microprocessors for digital further processing and storage of detected measurement data. The devices are typically produced in a compact and integrated construction, wherein coaxial distance and angle measuring elements and computer, control, and storage units are normally integrated in a device. Depending on the level of development of the total station, means for motorization of the target optics, for reflector-free route measurement, for automatic target search and tracking, and for remote control of the entire device are integrated.

Total stations known from the prior art also have a radio data interface for establishing a radio link to external peripheral components, for example, to a data acquisition device, which can be implemented in particular as a handheld data logger, remote control unit, field computer, notebook, small computer, or PDA. By means of the data interface, it is possible to output measurement data acquired and stored by the total station for external further processing, to read in externally acquired measurement data for storage and/or further processing in the total station, to input or output remote control signals for the remote control of the total station or a further external component, in particular in mobile field use, and to transfer control software into the total station.

For aiming at or targeting the target point to be surveyed, geodetic surveying devices of this type have, for example, a telescopic sight, for example, an optical telescope, as a targeting apparatus. The telescopic sight is generally rotatable about a vertical standing axis and about a horizontal tilt axis relative to a base of the measuring device, so that the telescope can be aligned on the point to be surveyed by pivoting and tilting. Modern devices can have, in addition to the optical vision channel, a camera, which is integrated in the telescopic sight and is aligned coaxially or in parallel, for example, for acquiring an image, wherein the acquired image can be displayed in particular as a live image on the display screen of the display-control unit and/or on a display screen of the peripheral device used for the remote control—for example, of the data logger or the remote control unit. The optic of the targeting apparatus can have a manual focus—for example, a set screw for changing the position of a focusing optic—or can have an autofocus, wherein the change of the focal position is performed, for example, by servomotors. Automatic focusing apparatuses for telescopic sights of geodetic devices are known, for example, from DE 197 107 22, DE 199 267 06, or DE 199 495 80.

SUMMARY

The above-mentioned surveying systems from the prior art share the feature that, optionally also employing a camera, the targeting unit or a surveying rod provided with the targeting unit is aimed at or observed by a stationary position determination unit, for example, a total station. However, automated guiding of a user or operator, employing the image data recorded by the stationary position determination unit, to a provided target point for the purpose of the staking thereof, is not disclosed, so that the staking process for an operator is relatively cumbersome and linked to a substantial time expenditure, if precise staking of the target point is to be ensured.

For a solution to this problem, a surveying system, designated in this patent specification as an operator guiding system, is proposed in U.S. Pat. No. 7,222,021 or corresponding EP 1 293 755, having a stationary base station corresponding to a stationary position determination unit, which is equipped with imaging means, for example, a camera, and a mobile station having the function of a mobile targeting unit, which is equipped with display means, for example, a display screen for displaying an instantaneous position of the user based on stored landscape images or data and instantaneous images, seen from the viewpoint of the stationary measuring unit. Furthermore, it is disclosed how an operator can be guided to the target point by means of correlation between the data which is instantaneously stored by the stationary measuring station from measured position data, including the camera image, for the mobile station, having the provided position of the target point, by marking on the display screen of the targeting unit, for example, by directional display by means of an arrow on the display screen.

A device for further acceleration and simplification of a surveying or staking method is described in the European patent application having the application number 10177211.9. A remote control unit having a camera for recording a camera image in a defined recording direction is described therein, wherein the image data of the camera can be brought into a spatial relationship with the target points in a coordinate system by means of a position determination unit and the camera. This allows more targeted activation of the target point for the operator and therefore further reduces the duration of the surveying procedure. However, this target search still requires the operator to actively search out the target point position and, linked thereto, compare the target point position to his instantaneous position or the position of the surveying rod, in particular multiple times.

The object of the present invention is to provide a surveying or marking system having associated units for the system and also a corresponding method, using which marking of a target point can be performed more rapidly, more simply, and with a higher degree of automation, in particular in terrain which is difficult to access using a surveying rod. A special object of the invention is to provide a possibility for making avoidable a visual comparison, which is to be carried out during a marking process by a user, of his position or a position of a surveying rod to a target point position.

This object is achieved by the implementation of the characterizing features of the independent claims. Features which refine the invention in an alternative or advantageous manner can be inferred from the dependent patent claims.

The subject matter of the invention is a geodetic marking system for marking a known target point having an automotive, unmanned, remote controllable targeting unit, wherein the targeting unit is embodied according to the invention by an air vehicle, and having a geodetic position determination arrangement for the external actual position determination of the targeting unit, wherein the targeting unit is implemented in such a manner that the targeting unit is positionable at least temporarily substantially fixed in position, in particular floating. Furthermore, the targeting unit carries a marking unit, which is in particular modularly removable, for marking the target point. In addition, the marking system has a control unit, wherein the control unit is configured in such a manner that as a function of the external actual position, which is determinable continuously in particular, and a known target point position of the target point, the targeting unit is positionable in an automatically controlled manner in a defined setpoint position, in particular in a defined tolerance region around the setpoint position, relative to the target point position, in particular continuously, and in consideration of the actual position, the setpoint position, and a defined marking direction from the marking unit to the target point, the marking unit is controllable for marking the target point such that the target point can be marked in the defined marking direction with geodetic precision, i.e., precisely within millimeters or with subcentimeter precision, in particular submillimeter precision.

Such a marking system according to the invention can allow marking of target points such that the positioning of the marking targeting unit is executed completely automatically and therefore an iterative approach of a user to a predefined target point is not necessary. For this purpose, the air vehicle can be controlled to a defined position in a remote controlled manner, e.g., by means of radio signals or by means of signals which are transmitted via wire, via infrared, or via Bluetooth to the targeting unit. In another context, for example, as an off-road vehicle can be used as the targeting unit; however, an air vehicle capable of flight is used in the scope of the invention, which is positionable by targeted activation of motor-driven rotors, wherein the respective air vehicle is unmanned and is simultaneously movable, in particular in a remote controlled manner, by means of the provided motorization.

A position of the targeting unit can be determined using the marking system for controlling the targeting unit or for generating control signals for the control. For this purpose, a position determination arrangement is provided. This arrangement can have a total station, a theodolite, a tachymeter, or, for example, a GNSS system, wherein respectively a module which corresponds to the appropriate arrangement is arranged on the targeting unit side. Through such an achievable interaction between a device provided for position determination and a component adapted thereto, a position of the targeting unit can be exactly determined and, in addition, the position of the targeting unit can be tracked continuously.

If a known target point position of the target point is known, based on the instantaneously determined targeting unit position, a position comparison can be carried out and/or the targeting unit or the air vehicle can be controlled depending on the respective positions. From these items of information, furthermore, a setpoint position for the targeting unit can be derived and this setpoint position can be defined as the target position for the targeting unit. The control of the targeting unit can then be performed in such a manner that it is controlled to the target position and positioned there. Positioning of the targeting unit can thus be performed at least temporarily substantially fixed in position, i.e., the targeting unit can hold a fixed position without variation independently of external influences over a temporary period of time. This can be achieved in particular by adapted control of the targeting unit.

The position of the targeting unit or a deviation from a predefined position can be established continuously by the position determination arrangement, which is in contact with the targeting unit. For this purpose, a transmitter unit assigned to the position determination arrangement can provide positioning signals, which can be received by a receiver on the targeting unit. If this arrangement has, for example, a GNSS transmitter or a GNSS system is used for the purpose of precisely determining the position of the targeting unit, the targeting unit can thus have a GNSS receiver, by means of which an item of position information can be received and a position can be determined therefrom. A conventional GNSS system for this purpose can be represented, for example, by GPS or GLONASS. Accordingly, a GNSS antenna can be arranged on the targeting unit, to be able to receive the signals associated with the respective system. In addition thereto, a GNSS reference station can be provided, which is also implemented to receive GNSS signals and additionally provides reference data or correction data, for example, for one of the known DGPS, RTK, or VRS methods for increasing the precision for a position determination. A targeting unit adapted for such a reference system can therefore additionally be implemented to receive correction signals and can carry out a geodetic position determination in consideration of these signals.

In particular, the actual position of the targeting unit can be established, in that a module arranged on the targeting unit, e.g., a reflector, is targetable by a surveying device, for example, by a total station or a theodolite. The position of the surveying device can already be known, for example, in that a calibration procedure was carried out on the side of the surveying device and the device could therefore carry out an intrinsic position determination by measuring known points. If a reflector on the targeting unit is now targeted by this surveying station, by determining the alignment of an emitted measuring beam, the direction to the targeting unit can be determined and, on the basis of a distance measurement carried out by means of the measuring beam, a distance to the targeting unit can be established. From these dimensions, the relative position of the targeting unit to the surveying device can be determined uniquely and exactly and, with the position of the surveying device known, an absolute, in particular geodetically precise, positioning of the targeting unit can be derived. On the basis of the position thus determined, in particular continuously, of the targeting unit, the control of the unit can be carried out. For this purpose, control data can be obtained from the items of position information and by means of these data the targeting unit can be moved or flown to a defined setpoint position.

The setpoint position can be determined in particular from the coordinates or position specifications of a target point. If this represents a ground point in the terrain, for example, the ground point itself can be defined as the target point, which—relating to an alternative aspect not according to the invention—can be approached by a vehicle. To make positioning of the vehicle easier, a target region around the setpoint position can be defined here, wherein the target point is considered to be reached as soon as the vehicle or the component specifying the position of the vehicle is located in the target region.

If the targeting unit is implemented according to the invention as an air vehicle—for example, a drone—and the setpoint position is to be able to be assumed in a floating manner, a setpoint position can in turn be defined which is located, for example, between 2 and 10 m vertically above the ground point or at a specific angle, in particular within a defined angle range, and distance to the ground point. A target or setpoint region, which has a defined position tolerance, around the setpoint position can also be generated for this embodiment, wherein the setpoint position is considered to be reached when the air vehicle, or again the component of the air vehicle which specifies its current position, is located in the setpoint region. In particular since the air vehicle cannot often be held floating at a fixed position for an unlimitedly long time due to external influences on the air vehicle, for example, due to changes in the air flow, temperature change, and/or variable pressure conditions, a definition of a corresponding setpoint region can be advantageous for the positioning. However, the air vehicle can maintain a position which is variable within a previously defined setpoint region by way of a compensating counter-control against an externally acting deflection force.

A described positioning of the targeting unit having geodetic precision can be utilized for various applications.

Using the present invention, marking of a target point can be performed while employing the geodetically precise positioning of the targeting unit (air vehicle). For this purpose, the targeting unit is equipped with a marking unit or carries such a marking unit. The marking unit can be embodied as an optical marking unit, in particular as a laser beam source, wherein the target point is marked in an optically visible manner by emitting the laser beam, and/or can carry out a marking of the target point by means of application of a marking consisting of dye, e.g., spray lacquer or ink jet. Furthermore, the marking of the target point can be performed in that an object, e.g., a magnet, is "dropped" by the targeting unit at the target point position and therefore placed on the target point. In addition, an adhesive marking, for example, a label or a reflector foil, can be applied to the target point by means of the targeting unit or a projectile, for example, a nail, can be fired from the targeting unit for the marking in such a manner that the target point is marked by incidence of the projectile thereon.

A control of the targeting unit and the marking unit for the marking can be performed by means of a control unit. This control unit can, on the one hand, control the positioning of the targeting unit by a comparison, in particular running continuously, of the instantaneous position of the targeting unit (actual position), the setpoint position, and the target point position. For this purpose, the control unit, for example, by generating control data, as a function of these positions, can move the targeting unit to the setpoint position or setpoint region and, upon reaching the setpoint position, the targeting unit can be positioned or held there. Therefore, the relative relationship of actual, setpoint, and target point positions can be known and, furthermore, by means of the control unit, with additional consideration of a marking direction of the marking unit, this unit can be driven in such a manner that the marking of the target point is performed. I.e., the marking unit is activated and/or controlled in such a manner that the target point is marked when, in consideration of the actual position of the targeting unit and the marking direction of the marking unit, the target point is precisely reached or hit by a marking generated by the marking unit. The data processing performed for this purpose can be carried out, for example, on the targeting unit, on the surveying device, or on a remote control unit.

In particular, in one embodiment of the marking system according to the invention, the position determination arrangement can have at least one transmitter unit for emitting positioning signals and the targeting unit can be implemented in such a manner that the positioning signals are receivable, in particular by means of a GNSS antenna, and the actual position of the targeting unit is determinable from the positioning signals. Geodetically precise position determination of the targeting unit can therefore be performed, which can be acquired and considered for the positioning of the targeting unit. In addition, this type of the position determination presumes that the positioning signals, which are provided by the transmitter unit, can be received by the targeting unit, i.e., the signals are not obstructed or blocked by any possible obstructions present between the transmitter unit and the targeting unit.

In particular, according to the invention, the transmitter unit can be implemented as a GNSS transmitter, in particular a GNSS satellite, in particular a GPS, GLONASS, or Galileo satellite, and the positioning signals can be embodied by GNSS signals or the transmitter unit can have a pseudo-satellite module and the positioning signals can be embodied by pseudo-satellite signals. For example, if the position determination of the air vehicle and the marking of a target point are to be performed in an enclosed space, for example, a manufacturing hall, often, no GNSS signal can be received by the targeting unit therein. In this case, positioning can be performed by means of a pseudo-satellite module, so-called pseudolites or pseudo-satellites, in the hall. The pseudolites can be placed at respective known positions and can emit items of position information therefrom by means of the pseudo-satellite signals, for example, in a signal format similar to a GNSS signal, by means of which a position determination can in turn be carried out on the part of the targeting unit. The signals can permit a determination of a relative position within a coordinate system representing the manufacturing space, for example, or an object coordinate system. Furthermore, if the positions of the pseudolites relative to a global coordinate system are known, an absolute, global position determination of the targeting unit can thus also be carried out indirectly. For such an exact position determination, signals can be received on the part of the air vehicle from four pseudolites, in particular wherein in the case of a shared timebase of the signals, the reception of three signals makes a position determination able to be carried out precisely. For example, in the case of positioning of the targeting unit at a known altitude, two signals can be sufficient for the position determination.

Furthermore, according to the invention, to increase the precision in the position determination, the position determination arrangement can have a GNSS reference station for emitting GNSS correction signals and the targeting unit can be implemented in such a manner that the GNSS correction signals are receivable and the actual position of the targeting unit is determinable from the received GNSS signals and the GNSS correction signals. By way of the correction signals thus additionally provided, more exact absolute position determination of the targeting unit becomes possible.

In a further embodiment of the marking system according to the invention, the air vehicle can have a reflector and the position determination arrangement can have a geodetic surveying device, in particular a theodolite or total station. The surveying device has at least one targeting apparatus, in particular a telescopic sight, wherein the targeting apparatus is pivotable, in particular by a motor, with respect to a base of the surveying device to change the alignment thereof, and has at least one emission unit which defines an optical target axis and one radiation source for the emission of an optical measuring beam for the distance measurement in parallel, in particular coaxially, to the optical target axis. In addition, an angle measuring functionality is provided for the high-precision acquisition of the alignment of the target axis, and analysis means are provided for data storage and control of the alignment of the targeting apparatus. The measuring beam can therefore be aligned on the reflector, such that the actual position of the targeting unit is determinable. The measuring radiation can be reflected back to the surveying unit on the reflector and detected therein. A distance from the surveying device to the targeting unit or to the reflector can thus be determined from this reflected measuring radiation and the position of the targeting unit can be specified in consideration of the alignment of the targeting apparatus.

Furthermore, in the scope of the invention, a signal transmittable to the targeting unit, in particular wherein the signal is embodied by a radio signal, a signal modulated on a laser beam, or an electronic signal, can have an item of position information, wherein the item of position information can be converted into control data in a first processing unit assigned to the targeting unit, or can have the control data itself, wherein the control data can be ascertained from the item of position information by means of a second processing unit, which is assigned to the surveying device. Therefore, if the position of the targeting unit is determined using a surveying device, the acquired items of position information can be transmitted directly, for example by means of radio, to the targeting unit and the items of position information can be used on the part of the targeting unit for the control, in particular for generating control data. Alternatively or additionally thereto, the items of position information can be processed further directly on the part of the surveying device and, based on this information, control signals or control data for controlling the targeting unit can be transmitted thereto.

According to the invention, the targeting unit implemented as an air vehicle can additionally be positionable at least temporarily floating substantially horizontally fixed in position, in particular wherein an effect on the positioning by external influences, in particular air flow, pressure variation, and/or temperature variation, can be compensated for in the vertical direction. In particular in the case of an air vehicle provided as a targeting unit, such a position compensation can ensure correct and usable positioning of the targeting unit. If, for example, a wind strength or a wind direction changes, which is taken into consideration for floating positioning of the air vehicle, a counter control can be carried out using a drive unit, for example, a rotor of the air vehicle, as a reaction thereto. It can be advantageous if the air vehicle substantially holds its horizontal position during a counter reaction and a correction or repositioning primarily occurs in the vertical direction for the compensation.

In addition, the marking system can have a remote control unit for controlling the targeting unit, in particular wherein the remote control unit has a display screen for displaying information. Using such a remote control unit, control-relevant data can be transmitted to and/or received from the targeting unit or furthermore manual control of the targeting unit can be performed by an operator. Communication and power supply between the remote control unit, the targeting unit, and/or a surveying device can be performed via a wire, for example. Furthermore, data processing for control can be performed on the remote control unit, wherein the remote control unit can be implemented, e.g., as a PDA, smart phone, or tablet PC.

In the scope of the invention, for example, marking of positions of boreholes on a wall can be carried out using the marking system. A digital model of a building or space can be stored for this purpose in the system, wherein as a function of the model, a definition of the positions of the holes can be performed. The targeting unit can, for example, also as a function of the digital model, be positioned in a defined manner relative to a borehole position and can cause the marking of the hole, for example, by visible laser radiation. By means of this marking, an operator of the system can now place the respective borehole or mark the position manually and subsequently control the targeting unit to the next borehole position or cause it to automatically assume the next position. Such a marking can be performed in turn there and therefore the boreholes can be marked or drilled successively.

In addition, according to the invention, the targeting unit can have a sensor unit for determining an alignment and/or the actual position of the targeting unit, in particular an inclination sensor, a magnetometer, an acceleration sensor, a yaw rate sensor, and/or a velocity sensor. In addition, the targeting unit can have a component which specifies the alignment of the targeting unit and the marking system can have an acquisition device, in particular a camera, for acquiring and/or targeting the component and for determining the alignment of the targeting unit from the location and arrangement of the component.

The determination of the position and orientation of the air vehicle can be performed, for example, by a laser tracker. The orientation of the air vehicle can be acquired by a measurement of the location of markings, which are arranged on the unit, by the sampling unit. The orientation of the air vehicle can be derived from the knowledge of the location and the arrangement of the markings while knowing the location of the laser tracker relative to the air vehicle. Therefore, the knowledge of the location in space follows from the position information and the orientation information. Such a general method for alignment determination is described, for example, in WO 2006/097408. The orientation can furthermore be determined on the basis of an offset of a receiver to a measuring beam axis, which is defined by a measuring beam targeting the receiver, wherein the optic of the receiver only has a limited aperture angle.

Furthermore, the determination of the alignment can be carried out by a method, wherein a laser beam is emitted in the direction of a detector arranged on the targeting unit and an emission direction of the laser beam is defined. This is followed by a determination of a point of incidence of the laser beam on the detector. The direction of incidence is derived from this point of incidence. The determination of the alignment of the detector relative to the laser source and therefore the targeting unit is now possible on the basis of a linkage of the direction of incidence to the emission direction. Such a method is known, for example, from WO 2008/138507.

In the case of a further known possibility for providing items of information about the orientation of the targeting unit, the position of the targeting unit is tracked and a movement direction is determined from the position changes. With the assumption that the movement direction corresponds to a specific orientation of the targeting unit, information about the orientation of the targeting unit can be derived therefrom. The position change can be determined, for example, by means of a continuous position determination by GPS.

In addition, the positional and rotational locating or alignment of an object in space can be performed by means of an optical measuring device. The measuring device can have an imaging optic and a detector which resolves location in two dimensions. The object or the targeting unit can have a known code pattern, e.g., a barcode or pseudo-random code, and the pattern acquired using the measuring device can be analyzed. Depending on the location of the acquired code, the respective location of the targeting unit in space can thus be concluded. A method corresponding to this principle is disclosed, for example, in EP 1 066 497.

The above-mentioned possibilities for determining an alignment can be used in combination with a position determination of the targeting unit for the exact determination of the six degrees of freedom (6-DoF) and therefore the precise location of the targeting unit in space.

The marking system according to the invention can furthermore have a regulating functionality, wherein upon execution of the regulating functionality, controlled by the control unit during a marking time window, the actual position of the air vehicle is continuously determined. This actual position can be determined by means of interaction of the geodetic surveying device with the reflector and/or by means of the sensor unit, and the air vehicle can be held stable based thereon in such a manner that the target point is continuously marked with geodetic precision during the entire marking time window by means of the marking unit.

In particular, the positioning of the air vehicle can be regulated in such a manner that the air vehicle is present in the setpoint position during the entire marking time window and/or the marking direction is continuously adapted and/or an error output is performed in the event of at least temporary non-occurrence of the marking of the target point.

A method according to the invention for controlling a marking, which is performed with geodetic precision, of a known target point has an automotive, unmanned, remote controllable air vehicle as a targeting unit, wherein an external actual position of the targeting unit is determined, in particular continuously. The targeting unit carries a marking unit, which is removable, in particular modularly, for marking the target point. In the scope of the method, as a function of the external actual position which is determined, in particular continuously, and a known target point position of the target point, the targeting unit is positioned in a defined setpoint position, in a defined tolerance region around the setpoint position, relative to the target point position, in particular continuously. Furthermore, in consideration of the actual position, the setpoint position, and a defined marking direction from the marking unit to the target point, the marking unit is controlled to mark the target point, such that the target point is marked in the defined marking direction with geodetic precision.

Using the method according to the invention, in general an air vehicle (targeting unit) can be moved into a defined position relative to a known target point position or relative to an arbitrary point, the position of which is known. Such positioning can form a general basis for an action to be executed furthermore using the targeting unit. In particular, the marking of the target point can be performed using the present invention.

For this purpose, firstly the targeting unit is controlled into a specific position—into the setpoint position—and positioned substantially fixed in position there as a function of its actual position and the target point position. For the marking of the target point, the marking unit is controlled as a function of the actual position, the setpoint position, in particular as a function of whether the targeting unit is located in the setpoint position or in the setpoint region, and the marking direction of the marking unit in such a manner that the target point is marked by the marking unit.

In particular, in the scope of the method according to the invention, positioning signals can be received by the targeting unit and the external actual position, in particular an alignment of the targeting unit, can be determined from the positioning signals, in particular wherein the positioning signals are embodied by GNSS signals, pseudo-satellite signals, and/or GNSS correction signals, and the actual position is determined from the GNSS signals and/or the GNSS-like signals, in particular in consideration of the GNSS correction signals. Additionally or alternatively thereto, a measuring beam can be reflected on the air vehicle side and the external actual position can be determined by means of the reflected measuring beam. By means of one of these methods or by a combination of the methods with one another, an absolute, geodetically precise position of the targeting unit can be determined and positioning thereof can be performed based thereon. If an ability to receive the signals must be ensured during the use of positioning signals or GNSS signals, in the event of a reflection of a measuring beam, a position determination can be performed independently of possible signal shielding.

Furthermore, in the scope of the invention, an alignment of the targeting unit, in particular in the pitch, roll, and yaw directions, and/or a distance to an object, in particular to an obstruction, can be determined, and/or an image, in particular wherein the image has the target point, can be acquired. The target point can therefore be located in the field of vision of the camera. A determination of the alignment of the targeting unit can be taken into consideration during control for the positioning or used for a requested alignment or for positioning in a defined alignment, for example. In addition, by the determination of distances to objects, obstructions in a flight path or a route of the targeting unit can be recognized and either bypassed, in particular automatically, or the targeting unit can be positioned in consideration of the respective obstruction. In addition, images of an environment can be acquired, in which the targeting unit is moved. By way of the acquisition of an image sequence, a movement or a path, along which the targeting unit moves, can also be determined and as a result thereof a continuous determination of the actual position can be derived. In particular in the case of the co-acquisition of the target point on an image, the targeting unit can furthermore be controlled to a setpoint position or placed there based on the image information. In addition, a user can thus have an item of image information available, on the basis of which he can control the targeting unit—also manually.

Furthermore—according to the invention—the marking of the target point can also be performed using optically visible radiation and a radiation direction of the radiation can be parallel, in particular coaxial, to the marking direction. The marking radiation can be activated upon reaching the setpoint position and with matching alignment of the marking direction, and can be emitted continuously and/or in pulses, to indicate the target point.

In particular in the scope of the method according to the invention, the marking direction of the marking unit can be aligned in parallel, in particular independently, to the vertical direction and/or in a defined manner relative to the alignment of the targeting unit, in particular wherein the marking unit is gimbal mounted and/or the targeting unit has alignment means for the defined alignment of the marking direction, in particular wherein the marking unit is pivoted in two axes, in particular in three axes. By way of the gimbal mounting, the marking direction can be continuously automatically aligned parallel to the vertical direction, i.e., parallel to the gravity vector, of the Earth and has the result that an exact alignment of the targeting unit is not absolutely necessary for marking the target point in the event of vertical positioning over the target point. However, if the targeting unit is not positioned vertically over a target point, for example because an obstruction such as a tree prevents such positioning, the marking direction can be aligned by means of the alignment means in such a manner that the target point is marked at a specific angle to the vertical direction. In addition, the alignment means can allow pivoting or rotation of the marking direction about up to three axes and therefore not only point marking of the target point, but rather also marking by a pattern, which arises, for example, during rapid movement of a marking embodied as laser radiation.

In the event of an effect on the positioning of the targeting unit (air vehicle) by external influences, in particular by air flow, pressure variation, and/or temperature variation, alternatively or additionally to a defined position change of the targeting unit to maintain a target point marking, a realignment of the marking direction of the marking unit can be performed. In this case, for example, the alignment of a laser beam used for the marking can be changed by the alignment means such that a change of an emission angle of the laser beam is performed as a function of an induced offset of the targeting unit, and the beam therefore remains oriented towards the target point and still marks it in the offset position of the targeting unit.

In one embodiment, in the scope of the method, a path can be defined by waypoints, wherein the targeting unit is moved along the path, in particular wherein an optimization of a path course is performed, in particular automatically, and/or the path has the target point and/or the setpoint position, and/or marking of the position of the waypoints as intermediate target points is performed continuously along the path. Therefore, waypoints can be staked, which define the route to a target point and/or which form intermediate target points and therefore are also to be marked. Based on the determined waypoints, in addition, the movement path of the targeting unit can be optimized, in particular if known obstructions are flown around beforehand by the definition of the waypoints. The marking of the waypoints can furthermore be performed by means of an optical system, for example, a visible laser beam, or by means of a color marking, for example, using a lacquer or spray lacquer. In addition, the marking can be executed fully automatically, i.e., the targeting unit moves continuously from waypoint to waypoint and optionally respectively performs a marking, or can be performed semi-automatically, i.e., the targeting unit moves automatically to one waypoint and holds the position until a user gives a signal for positioning at the next waypoint.

In a further embodiment of the invention, items of information and/or control commands, in particular the target point position, can be input into the targeting unit, and/or items of information, in particular the acquired image, can be output, in particular on a display screen. Programming and/or control of the targeting unit can be simplified and accelerated by this communication possibility with the targeting unit.

In the scope of the method according to the invention, in the case of regulation during a marking time window, the actual position of the air vehicle can be continuously determined and, by means of the measuring beam reflected on the air vehicle side or by means of a sensor unit for determining an alignment and/or the actual position of the air vehicle, the air vehicle can be held stable based thereon in such a manner that the target point is continuously marked with geodetic precision during the entire marking time window by means of the marking unit. In particular the positioning of the air vehicle can be regulated in such a manner that the air vehicle is present in the setpoint position during the entire marking time window and/or the marking direction is continuously adapted and/or an error output is performed in the event of at least temporary non-occurrence of the marking of the target point.

A further object of the invention is an automotive, unmanned, remote controllable targeting unit, wherein the targeting unit is implemented according to the invention as an air vehicle, in particular as a drone, for use in a marking system according to the invention. The targeting unit is additionally implemented in such a manner that the targeting unit is positionable at least temporarily substantially fixed in position, in particular floating. Furthermore, items of position information for determining an external actual position of the targeting unit and for generating control data and/or the control data are transmittable directly to the targeting unit. In addition, the targeting unit carries a marking unit for marking a target point, in particular wherein the marking unit is embodied as modularly removable, and the control data are embodied in such a manner that as a function of the external actual position, which is determinable, in particular continuously, and a known target point position of the target point, the targeting unit is positionable in a defined setpoint position, in particular in a defined tolerance region around the setpoint position, relative to the target point position, in particular continuously. In consideration of the actual position, the setpoint position, and a defined marking direction from the marking unit to the target point, the marking unit is controllable to mark the target point such that the target point can be marked in the defined marking direction with geodetic precision.

The targeting unit according to the invention can be embodied, for example, by an air vehicle, which can be positioned floating substantially fixed in position by means of at least two rotors and/or nozzles. With respect to an alternative aspect, not according to the invention, the targeting unit can be embodied, for example, by an off-road vehicle, which can be controlled to drive to a target position and is thus positionable.

Furthermore, the targeting unit can be remote controlled, e.g., by means of radio signals, via a laser beam, or via wire, wherein the targeting unit itself is embodied as unmanned and automotive, i.e., it has a motorized drive, which provides an independent locomotion of the targeting unit. The targeting unit additionally has a marking unit, using which marking of the target point can be carried out. The targeting unit can be controlled and placed by control data in consideration of the intrinsic position (actual position), the target point position, and a position in which the targeting unit is to be positioned (setpoint position). With additional consideration of the marking direction in the control data, the target point can then be marked geodetically precisely by the marking unit.

In particular, a targeting unit according to the invention can have a receiver for positioning signals, in particular a GNSS antenna, and a processing unit for determining an actual position of the targeting unit from the positioning signals. Furthermore, in particular the positioning signals can be embodied by GNSS signals, in particular wherein the GNSS signals are represented by GPS, GLONASS, or Galileo signals, pseudo-satellite signals, and/or GNSS correction signals and the actual position can be determinable from the GNSS signals and/or the GNSS-like signals, in particular in consideration of the GNSS correction signals. Furthermore, the targeting unit can have a reflector. By means of such receivers or by means of the reflector, an absolute position of the targeting unit can be determined, in that either the positioning signals or GNSS signals are acquired and converted into position information or the reflector is targeted and thus the position of the targeting unit is determined.

A targeting unit as defined in the invention (air vehicle) can furthermore have a sensor unit for determining an alignment and/or the actual position of the targeting unit, in particular an inclination sensor, a magnetometer, an acceleration sensor, a yaw rate sensor, and/or a velocity sensor. By means of such a sensor unit and the alignment of the targeting unit which can thus be acquired, a consideration of the alignment can be performed, for example, during the positioning of the unit and/or the alignment of the targeting unit can be controlled in a defined manner.

In addition, the targeting unit according to the invention can have a sensor for distance measurement to objects, in particular radar, wherein by means of this sensor, for example, obstructions can be recognized and therefore taken into consideration or bypassed during the movement of the targeting unit. Furthermore, the targeting unit can have an optical acquisition unit, in particular a camera, for acquiring an image, in particular wherein the image has the target point or the target point is located in the field of vision. Using this acquisition unit, for example, a video camera, one or more images of a camera environment or an air recording of a terrain can be acquired and a change in the position of the targeting unit can be established, for example, by image processing processes. In addition, the item of image information can be used for the purpose of carrying out the control of the targeting unit, in particular toward a defined position, and/or for providing an item of image information for measuring or marking processes or images for documentation of a surveying process to an operator.

In addition, a position determination of the targeting unit can be performed as a function of acquired images. For this purpose, a series of images can be acquired, the image regions of which respectively partially overlap. The overlap regions can be compared, for example, by a comparison of patterns acquired on the images, in particular by image processing or comparison of the overlap regions of the images. The relative location of an image with respect to a following image can be determined therefrom and a movement progress of the image acquisition unit and therefore of the targeting unit can be derived from the size of the overlap region and a rotational angle, by which the following image must be rotated by way of image processing so that a correspondence of a noteworthy pattern in the overlap region can be achieved, for example.

Furthermore, a recognition of noticeable waypoints, the coordinates of which are known, can be performed, and an at least horizontal absolute position can be directly determined therefrom. In particular such a position determination can be carried out, for example, in the event of a failure of the GNSS system or masking of the GNSS signals, so that no position determination is possible, wherein a starting point of the targeting unit, the coordinates of which are known, can be taken consideration during the into determination. Zoom factors of individual or multiple images can be compared to one another for the at least coarse determination of a vertical position change and in turn an altitude change can be concluded from any image pattern correspondences.

By means of the acquired images, the targeting unit can be stabilized in position on the basis of a time-invariant texture, for example, on the ground. This stabilization can in turn be performed by a comparison of images acquired at intervals in time, in such a manner that a position correction of the targeting unit is performed with the goal of bringing an instantaneously acquired image or a texture acquired on the image into correspondence with the texture on an image acquired previously with respect to time. This can simultaneously assist the precision of the marking or make the targeting unit positionable in the event of a temporary interruption of a control signal.

In addition, autonomous return movement of the targeting unit to the respective starting point can be performed based on the images acquired during a movement of the targeting unit toward a target point. This return movement can be performed, on the one hand, by a movement along a route derived from the images or by a movement by means of image comparison. The image comparison can be executable as a comparison of acquired images of the movement toward with images acquired during the return movement.

In addition, a targeting unit according to the invention, for the defined alignment, in particular independently parallel alignment of the marking direction, can have a gimbal mount and/or alignment means for the marking unit, in particular wherein the marking unit is pivotable in two axes, in particular in three axes. In particular, the marking unit can furthermore have a beam source for the emission of optically visible radiation and the beam source can be arranged in such a manner that an emission direction of the optical radiation extends in parallel, in particular coaxially, to the marking direction. In the case of a gimbal mount of the marking unit, a continuous alignment of the marking direction or the optically visible radiation, for example, laser radiation in the visible wavelength range, can be implemented in parallel to the vertical direction of the Earth in such a manner that upon positioning of the targeting unit carrying the marking unit vertically over a ground point, this ground point is automatically marked upon activation of the marking unit, i.e., for example, upon emission of the laser radiation. With the aid of the alignment means, the marking direction can be aligned at a defined angle relative to the vertical direction and therefore marking of a target point can also be performed if the targeting unit is not located vertically over the target point, but rather is placed offset to the vertical direction. In particular if an obstruction in the terrain, for example, a tree or projecting rock, prevents a vertical positioning of the targeting unit over the target point, the marking of the point can nonetheless be carried out. Furthermore, a targeted alignment of the marking direction can be performed to compensate for or balance out undesired position changes of the targeting unit caused by external influences, so that in spite of such an offset, marking of the target point can be performed.

Furthermore, the targeting unit—according to the invention—can have an input unit, in particular a keyboard, touch-sensitive display screen, and/or data interface, for inputting information and/or control commands, in particular the target point position, and/or an output unit, in particular a display screen, for outputting information, in particular the image acquired by the camera. Such input possibilities can allow or make it easier for a user to input items of information which are required for a work procedure using the targeting unit. A target point position can thus be stored and the targeting unit can automatically and independently fly to this position and therefore make fully automatic marking of a target point able to be carried out. Corresponding items of position information can also be transmitted via the data interface into and/or out of the targeting unit. An additionally provided display screen can make the data input even easier for the user and/or provide environmental information, for example.

A remote control unit for controlling the targeting unit can additionally be assigned to a targeting unit according to the invention, in particular wherein the remote control unit has a display screen for displaying information and/or the image acquired by the camera. This remote control unit can offer the user additional or alternative input and output means. Programming of the targeting unit can thus be performed by means of this remote control unit and, for example, an image acquired on the part of the targeting unit can be displayed on a display screen or the remote control unit such that a continuously generated environmental image can be used for the control, in particular for a manual control by an operator.

A marking arrangement according to the invention for marking a known target point and for use in a marking system according to the invention has a remote controllable marking unit and a geodetic position determination arrangement, in particular a theodolite or total station, for the external position determination of the marking unit, wherein an external actual position of the marking unit is determinable, in particular continuously, by means of the position determination arrangement. The marking arrangement has a control unit, wherein the control unit is configured in such a manner that as a function of the external actual position, which is determinable, in particular continuously, and a known target point position of the target point, the targeting unit is positionable, in particular continuously, in a defined setpoint position, in particular in a defined tolerance region around the setpoint position, relative to the target point position. Furthermore, the control unit is configured such that in consideration of the actual position, the setpoint position, and a defined marking direction from the marking unit to the target point, the marking unit is controllable such that the target point can be marked in the defined marking direction with geodetic precision.

Using the position determination arrangement, the absolute and instantaneous position of the marking unit can be established, in particular the marking unit can therefore be tracked and as a result the position thereof can be acquired continuously. If the instantaneous position of the marking unit and the target point position are known, the marking unit can be controlled as a function of these two positions such that it is positionable in a defined setpoint position. Furthermore, the marking unit can be activated by means of the control unit such that in consideration of the instantaneous marking unit position, in particular in the event of correspondence with the setpoint position, and an alignment of the marking direction, the marking of the target point by the marking unit can be performed.

The position determination arrangement of the marking arrangement according to the invention can have at least one transmitter unit for emitting positioning signals and the marking unit can be implemented in such a manner that the positioning signals are receivable, in particular by means of a GNSS antenna, and the actual position of the marking unit is determinable from the positioning signals. In particular, the transmitter unit can be implemented as a GNSS transmitter, in particular a GNSS satellite, in particular a GPS, GLONASS, or Galileo satellite, and the positioning signals can be embodied by GNSS signals. The transmitter unit can furthermore have a pseudo-satellite module and the positioning signals can be embodied by pseudo-satellite signals. In particular, the position determination arrangement can have a GNSS reference station for emitting GNSS correction signals and the marking unit can be implemented in such a manner that the GNSS correction signals are receivable and the actual position of the marking unit is determinable from the received GNSS signals and the GNSS correction signals.

A further position determination possibility according to the invention can be implemented by the position determination arrangement having a geodetic surveying device, in particular a theodolite or total station, wherein the position of the marking unit is specified with high precision in space by a reflector. The geodetic surveying device has a targeting apparatus, in particular a telescopic sight, wherein the targeting apparatus is pivotable, in particular by a motor, in relation to a base of the surveying device to change the alignment thereof and has at least one emission unit which defines an optical target axis and one radiation source for the emission of an optical measuring beam in parallel, in particular coaxially, to the optical target axis for the distance measurement. In addition, an angle measuring functionality for the high-precision acquisition of the alignment of the target axis and analysis means for data storage and control of the alignment of the targeting apparatus are provided. The measuring beam can therefore be able to be aligned on the reflector, such that the actual position of the marking unit is thus determinable. By way of a position determination using a surveying device, a possibly restricted reception capability of GNSS signals and a restricted or impossible position determination linked thereto can be replaced and the determination can nonetheless be carried out. For this purpose—after an absolute position of the surveying device is known, for example, by means of an initializing calibration procedure—the determination of the instantaneous position of the marking unit can be carried out when a line of sight exists between surveying device and marking unit.

In a marking arrangement according to the invention, the marking unit can have a data interface, in particular embodied by radio module, Bluetooth interface, infrared interface, and/or com-port, for control and/or information exchange with an automotive, unmanned, remote controllable targeting unit embodied as an air vehicle. The data interface can be used for the purpose of connecting the marking unit to a targeting unit and therefore providing variable positioning, in particular automatic and/or controllable positioning, of the marking unit. Arbitrary items of information can be exchanged between the two components via the data interface and thus, for example, feedback for the control to a user or a direct activation of the targeting unit can be performed.

A further object of the invention is represented by a computer program product according to the invention, which is stored on a machine-readable carrier, or computer data signal, embodied by an electromagnetic wave, having program code for carrying out a method according to the invention, in particular when the program is executed in an electronic data processing unit. The computer program product or computer data signal can be designed in such a manner that control instructions, in particular in the form of algorithms, are provided therein, using which a method according to the invention for controlling marking, which is performed with geodetic precision, of a known target point can be performed using an automotive, unmanned, remote controllable targeting unit.

BRIEF DESCRIPTION OF THE DRAWINGS

The method according to the invention, the marking system according to the invention, the targeting unit according to the invention, and the marking arrangement according to the invention are described hereafter in greater detail solely as examples on the basis of specific exemplary embodiments which are schematically shown in the drawings, wherein further advantages of the invention are also discussed. In the specific figures:

FIG. 7 shows a determination according to the invention of the alignment of a marking direction.

DETAILED DESCRIPTION

Figure 1:
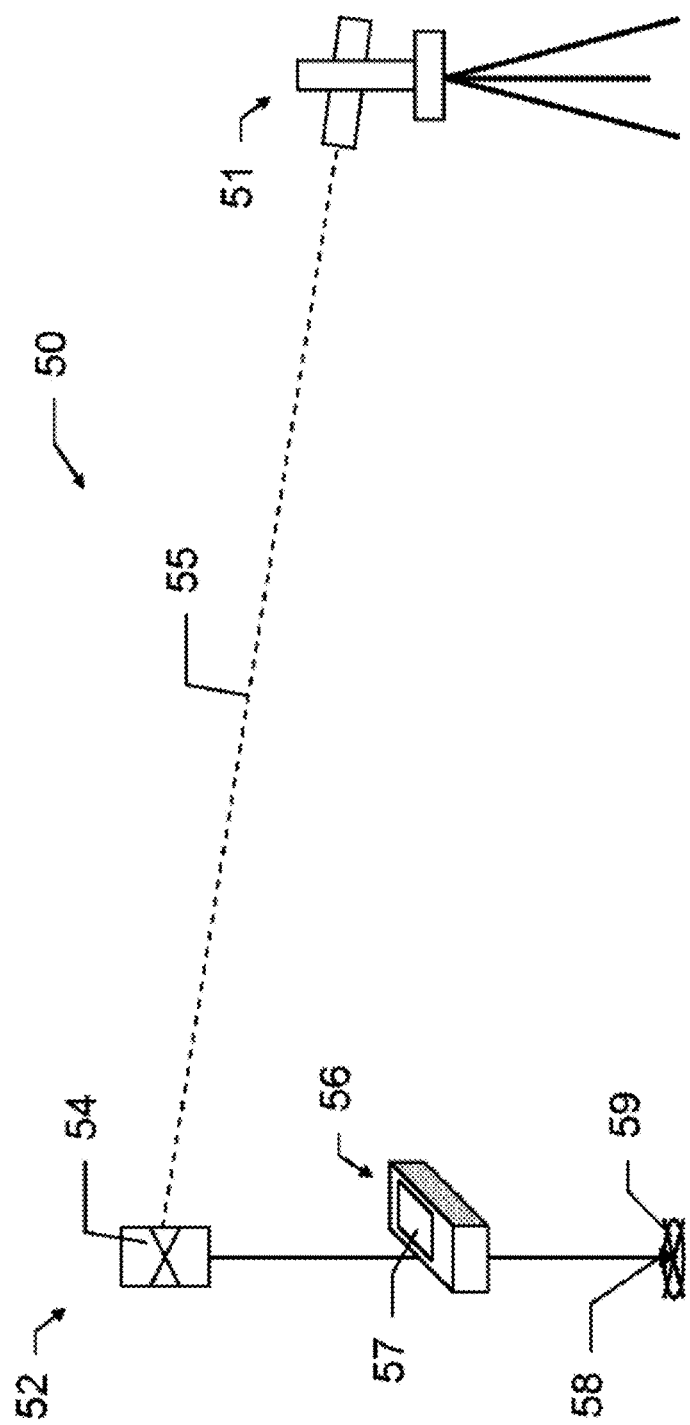
FIG. 1 shows a marking or surveying system according to the prior art.

FIG. 1 shows a surveying system 50 according to the prior art. The system 50 has a surveying device 51 and a surveying rod 52. Furthermore, a reflector 54, a controller 56, which is removably attachable to the rod 52, having a display screen 57, and a bottom end 58 which tapers to a point are provided on the surveying rod 52. A targeting apparatus of the surveying device can emit a measuring beam 55, using which the reflector 54 can be targeted and therefore a distance from the surveying device to the surveying rod can be determined. In addition, a surveying device 51 according to the prior art can have angle meters, by means of which an alignment of the surveying device 51 can be acquired. A relative position, i.e., a position determination in an interior coordinate system of the surveying device 51, of the surveying rod 52 in relation to the surveying device 51 can therefore be determined unambiguously, in consideration of the alignment and the distance. For a determination of an absolute position, i.e., a position in an external coordinate system, after a setup of the surveying device 51, the latter can be calibrated in an environment and therefore the absolute position of the surveying device 51 can be determined. Such calibration can be performed, for example, by measuring already known target points in the measurement environment. By way of a linkage of the external coordinate system, in which the device 51 was calibrated, with the interior coordinate system of the surveying device 51, an absolute position determination of an arbitrary point which is acquired or targeted using the surveying device 51 can now be carried out. In particular to make targeting easier for an operator, the surveying device can have a camera, using which an image of the measurement environment, in particular in the direction of the targeting direction, can be acquired. A camera image thus generated can be displayed, for example, on the part of the surveying device or on the display screen 57 of the controller 56.

Such a surveying system 50 can be used, for example, for surveying objects. For this purpose, the surveying rod 52 can be placed by a user at a point 59 on the object to be surveyed and vertically aligned. In this positioning, the reflector 54 can then be targeted by the surveying device 51 and the position of the reflector can be determined. In consideration of the length of the rod 52, the position of the point 59 can thus be calculated unambiguously and exactly and the coordinates thereof can be determined.

The marking of already known target points 59 represents a further use of the surveying system 50. In this case, the point coordinates can be stored in the system 50, wherein a user can find and subsequently mark the target point 59 by guiding and placing the surveying rod 52 on the target point 59. According to the current prior art, this marking procedure can be executed by a user alone in particular if the user can simultaneously carry the surveying rod 52 and can obtain an item of information about the instantaneous position of the surveying rod and the target point position. This can be implemented by a radio link between the controller 56 and the surveying device 51. The position of the bar 52 or the reflector 54 can thus be determined continuously and transmitted to the controller 56. The user can thus move step-by-step or guide himself to the target point which is sought by a comparison of this position to a stored target point position—again with incorporation of the length of the rod 52. If the target point 59 has been reached, it can be marked, for example, by means of a stake or by means of spray paint.

To make the staking process easier, the surveying device 51 can be aligned, in particular automatically, on the reflector 54 of the surveying rod 52 and "coupled" thereon, so that automatic target tracking of the rod 52 can be performed. Such target tracking can be implemented by means of an automatic target recognition device (automated target recognition, ATR), which is integrated in the surveying device 51. For this purpose, the deviation of a laser beam reflected by the reflector 54 from a zero position on a photodiode can be acquired in such a manner that a movement direction of the reflector 54 relative to the surveying device 51 can be derived from the deviation and the surveying device 51 can be tracked in accordance with this movement or the alignment of the surveying device 51 on the reflector can be readjusted 54, so that the deviation on the photodiode is minimized.

Figure 2:
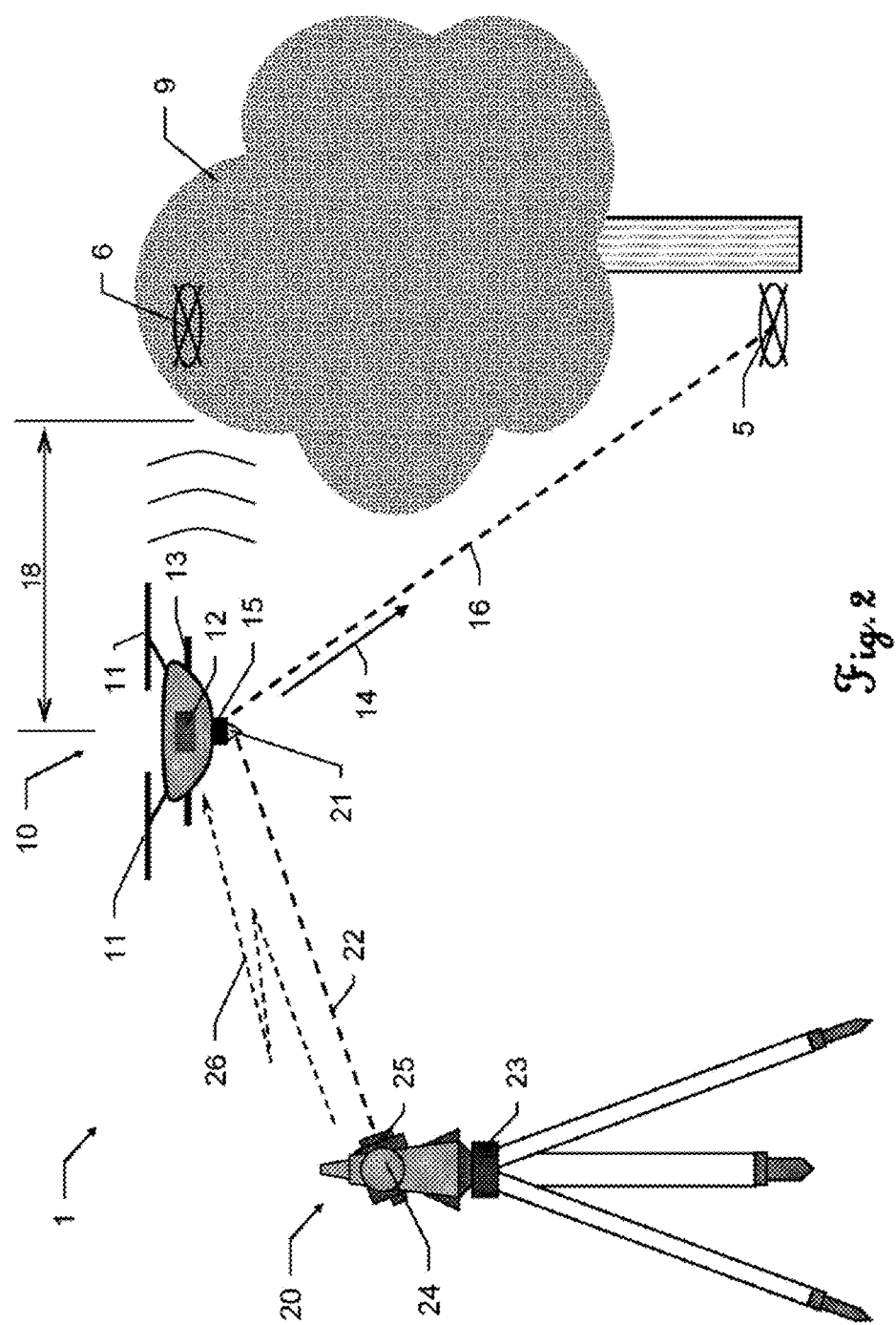
FIG. 2 shows a marking system according to the invention having a surveying station and an air vehicle implemented as a targeting unit.

FIG. 2 shows a marking system 1 according to the invention having an air vehicle 10, which represents the targeting unit 10 according to the invention of the system 1, and a surveying station 20, wherein the surveying station 20 embodies the position determination arrangement. The air vehicle 10 has two drive units 11, in particular rotors, which permit at least temporary positioning of the air vehicle 10 substantially fixed in location in a defined position, wherein the positioning can be performed floating vertically above a defined point. Depending on the activation of the drive units 11, the air vehicle 10 can be aligned and/or moved in a direction, or a movement direction can be changed. Furthermore, the targeting unit 10 has a sensor unit 12, wherein the sensor unit 12 can have a magnetometer, an at least two-axis inclination sensor, acceleration sensors, and/or a gyroscope. The sensor unit 12 can thus provide a determination of an inclination or an alignment of the targeting unit 10. In addition thereto, sensors are provided for the distance measurement 7 to objects 9, in particular obstructions, in order to prevent a collision with such an obstruction during an automated movement of the air vehicle 10 and to be able to bypass these objects 9, in particular also automatically, or to be able to bring the air vehicle 10 closer to the object 9 up to a predefined distance 18. For this purpose, for example, radar, ultrasonic, and/or optical sensors can be provided, for example, a camera or laser scanner. Furthermore, reaching a setpoint position 6 using the targeting unit 10 can be prevented by such obstructions.

The targeting unit 10 also carries a marking unit 15 for marking target points 5. The marking unit 15 can have for this purpose, for example, a laser beam source for the emission of optically visible laser radiation 16 in parallel, in particular coaxially, to a marking direction 14. The alignment of the marking direction 14 or of the laser beam 16 can be performed by means of alignment means assigned to the marking unit 15. For the alignment, for example, positioning motors, which make it possible to carry out pivoting of the marking unit 15, or mirrors, using which a deflection of the laser beam 16 can be performed, can be provided. The alignment or deflection can be performed in at least two axes, in particular in three axes, such that not only a point marking of the target point 5, but rather also a marking using a pattern or an alternative two-dimensional optical mark, can be performed. For better perception of the marking by a user of the system 1, the laser radiation can also be emitted in pulses. In particular, the laser radiation 16 or radiation generated by an additionally optical radiation source can be used for measuring a distance to an object or to the target point 5.

The alignment of the marking direction 14 in the direction of the target point 5 can be controlled by a control unit of the marking system 1. For precisely targeted alignment, the position of the targeting unit 10 can be determined and taken into consideration for the calculation of the alignment. In one embodiment, the position determination can be performed by targeting a reflector 21 arranged on the targeting unit 10 by way of a surveying station 20—as is known from the prior art. A measuring beam 22 can be oriented towards the reflector 21, the reflected beam can be detected by the surveying device, and the distance of the targeting unit 10 from the surveying device 20 can be determined therefrom. By means of an angle meter in each case in the pivotable base 23 and the pivotable mount 24 of the targeting apparatus 25, as a result an exact position of the targeting unit 15 relative to the surveying device 20 and, in the event of linkage of the interior coordinate system of the surveying device 20 to an external coordinate system, an absolute position of the targeting unit 10 can be determined.

The surveying station 20 can in turn be automatically aligned in particular on the reflector 21 of the targeting unit 10 and "coupled" thereon, such that automatic target tracking of the reflector 21 or the targeting unit 10 can be performed. Such target tracking can be implemented according to the prior art by means of an automatic target recognition device (automated target recognition (ATR)), which is integrated in the surveying station 20. For this purpose, the deviation of a measuring beam 22, which is reflected by the reflector 21, from a zero position on a photodiode can be acquired in such a manner that a movement direction of the reflector 21 relative to the surveying station 20 can be derived from the deviation and the surveying station 20 can be tracked according to this movement or the alignment of the surveying station 20 on the reflector 21 can be readjusted, such that the deviation on the photodiode is minimized.

The generated items of position information can be converted in the surveying station 20 into control signals for controlling the air vehicle 10 and transmitted, for example, by means of radio signals 26 or by means of a laser beam, in particular as information modulated onto the laser beam, to the air vehicle 10. Alternatively or additionally, the items of position information can be transmitted to the air vehicle 10 and processed further therein for the control of the device 10.

Figure 3:
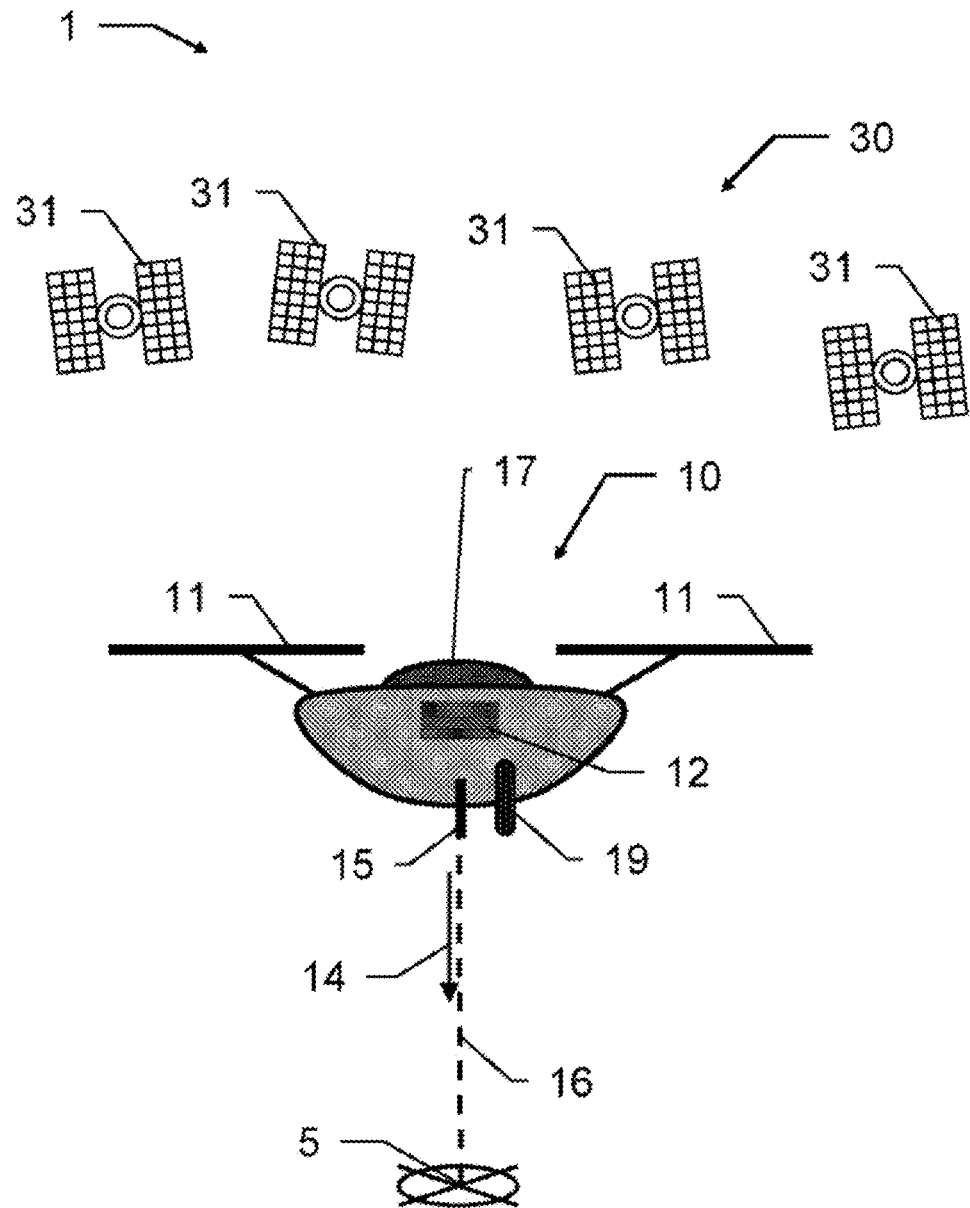
FIG. 3 shows a further embodiment of the marking system according to the invention having a GNSS system and an air vehicle implemented as a targeting unit.

FIG. 3 shows a further embodiment of a marking system 1 according to the invention having a targeting unit 10 according to the invention and a GNSS system 30 as a position determination arrangement. The GNSS system can be embodied by a number of satellites 31, which each emit signals for the position determination of the targeting unit 10. Correspondingly thereto, a GNSS receiver 17 is arranged on the targeting unit 10, using which receiver signals emitted by the satellites 31 can be received. A position determination can in turn be carried out on the part of the targeting unit 10 from these signals and a geodetically precise position for the targeting unit 10 can accordingly be ascertained. Furthermore, the targeting unit 10 can have drive units 11 for moving the targeting unit 10, a sensor unit 12 for determining the alignment of the targeting unit 10, and an acquisition unit 19, in particular a video camera. The sensor unit 12 can contribute to improving the positioning of the targeting unit 10, for example, in that ultrasmall changes in the position can be acquired using an acceleration sensor and a counter control of the targeting unit 10 can be performed based on this acquisition. By means of the camera 19, an image or an image sequence of a measuring environment can be acquired, stored, and/or transmitted via a transmitter to a remote control of the targeting unit 10 and displayed on a display screen. Furthermore, a movement or a path along which the targeting unit 10 moves can be derived by image processing of an image sequence.

A marking unit 15 is arranged on the targeting unit 10 for marking a target point 5, wherein the marking direction 14 of the marking unit 15 is oriented substantially parallel to the Earth's gravitational field. This alignment can be implemented by a gimbal mount of the marking unit 15 and can therefore ensure a continuous automatic alignment of this type. If the targeting unit 10 is positioned vertically over a target point 5 to be marked, the marking of the target point 5 can be performed solely by an activation of the or one active marking unit 15 because of this mount. In particular, the marking unit 15 can be embodied by a laser beam source, which emits laser radiation 16 in the visually perceptible wavelength range, wherein the control or activation of the beam source can be performed by a control unit in consideration of the positioning of the air vehicle 10. The radiation can be emitted continuously or in pulses.

Figure 4:
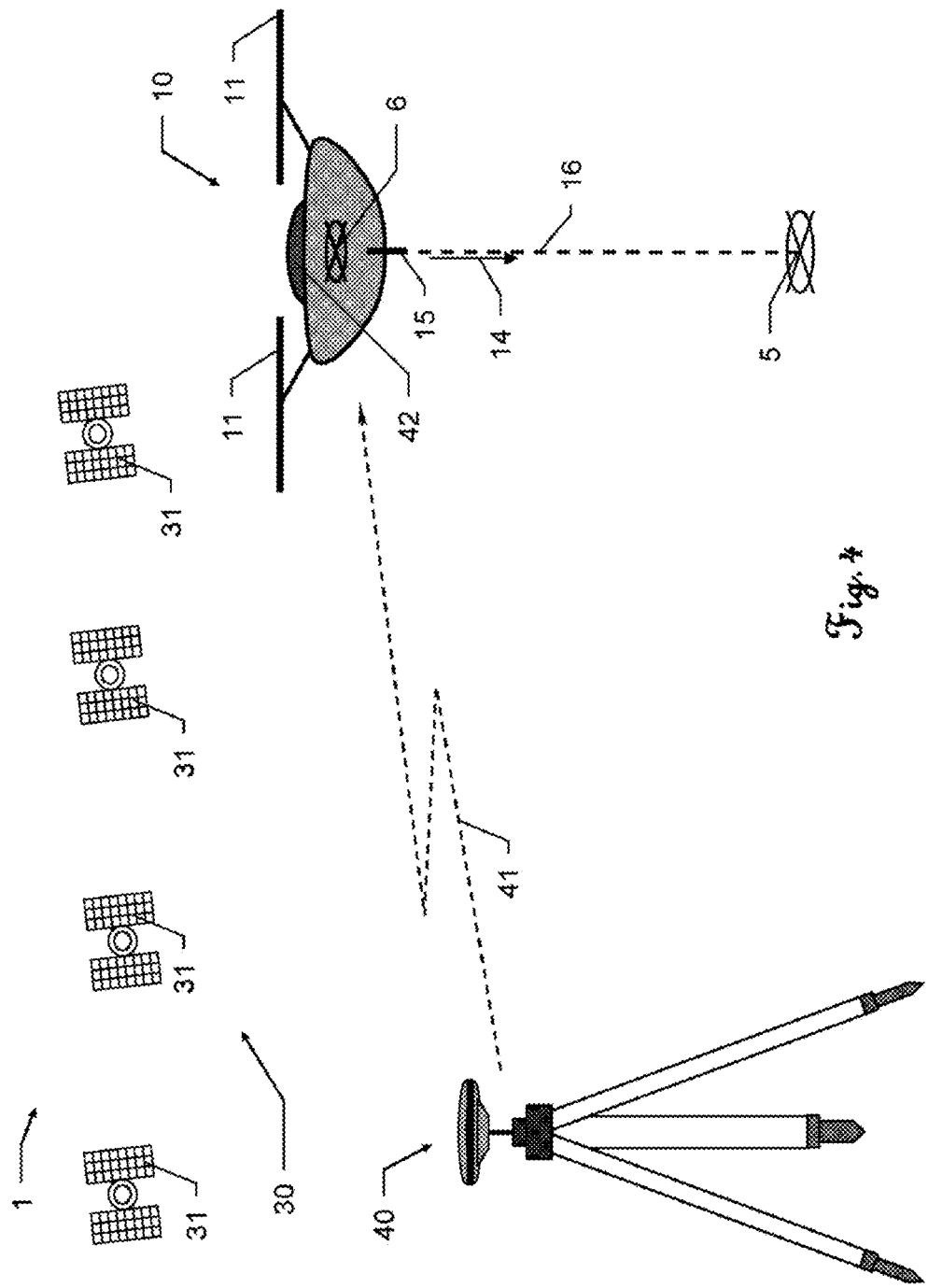
FIG. 4 shows a further embodiment of the marking system according to the invention having a GNSS system, a GNSS reference station, and an air vehicle implemented as a targeting unit.

A combination of the embodiment from FIG. 3 with a GNSS reference station 40 is shown in FIG. 4. The GNSS signals emitted by the satellites 31 of the GNSS system 30 are received in this case, together with GNSS correction signals 41 provided by the reference station 40, at a receiving unit 42 on the targeting unit 10 and processed further. A position determination can be performed from the signals, which has a higher precision with respect to a position determination performed only using GNSS signals.

The marking of the target point 5 using a marking system 1 of this type according to the invention can also be performed similarly to the marking procedure described for FIG. 3. The air vehicle 10 can be positioned by the rotors 11 vertically above a target point 5 in a setpoint position 6. The marking unit 15 can be gimbal mounted such that the marking direction 14 of the activated marking unit 15 is automatically aligned on the target point 5 and marks the latter using a laser beam 16, for example.

Figure 5:
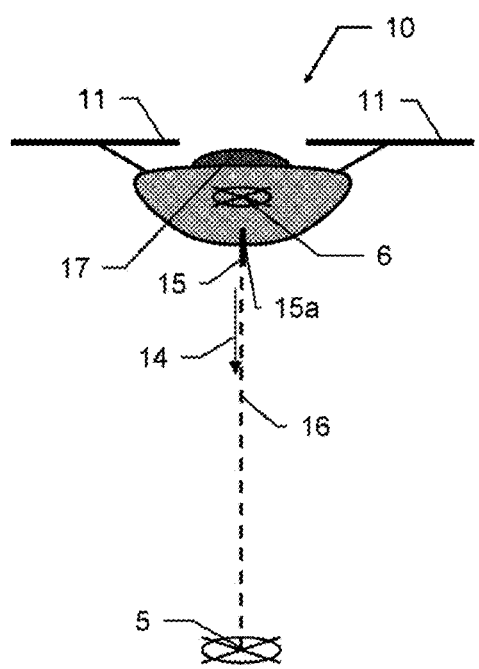
FIG. 5 shows an embodiment of an air vehicle according to the invention.

FIG. 5 shows a targeting unit 10 according to the invention, embodied by an air vehicle 10, for example, a drone having four drive units 11, in particular rotors, a receiver module 17, and a marking unit 15, wherein the marking unit 15 is fastened in a modularly removable manner on the air vehicle 10. The rotors 11 can be activated in such a manner that by way of a respective alignment and/or a respective individually adjustable rotational velocity, a floating positioning of the air vehicle 10 is positionable at an arbitrary point, for example, at a setpoint position 6. The setpoint position 6 can typically be located vertically, i.e., in the parallel direction to the gravitational field of the Earth, over a target point 5 to be marked. The receiver module 17 can be implemented, for example, to receive GNSS signals, GNSS correction signals, and/or radio signals, to be able to carry out a position determination of the targeting unit 10. The position determination of the targeting unit 10 can also be performed by means of a surveying station, the targeting unit of which can measure and track the targeting unit 10 or a reflector arranged on the targeting unit 10 and can thus ascertain a distance and angle to the unit 10. The items of position and control information which can thus be derived can be transmitted to the targeting unit 10 and received there by the receiver module 17.

Furthermore, the marking unit 15 for marking the target point 5 can have a laser beam source for the emission of an optically visible laser beam 16, which marks the target point 5, and/or other marking means, for example, a spray device for marking the point 5 by means of spraying a marking paint. A marking direction 14 of the marking unit 15, depending on the embodiment, for example, the emission direction of the laser radiation 16 and/or a spray direction of the spray device, can always be oriented in parallel to the vertical direction in the case of a gimbal mount of the marking unit 15. Alternatively or additionally, alignment means can be provided for aligning the marking direction 14, in particular mirrors which can be aligned in a defined manner, or for aligning the marking unit 15, in particular positioning motors, at a defined angle to the gravitational field or gravitation vector. Pivoting of the marking direction 14 or of the marking unit 15 can be performed in up to three axes. In addition, the targeting unit 10 can have a device for distance measurement 15a to an object, in particular to the target point 5. The distance measuring device 15a can in turn be aligned via further alignment means, in particular in three axes, on a point to be surveyed. Alternatively, a distance measurement can be carried out by means of the laser beam 16 for the marking.

By means of an acquisition unit, for example, a camera, which is additionally arranged on the targeting unit 10, an image or an image sequence of a measuring environment can be acquired, stored, and/or transmitted via a transmitter to a remote control of the targeting unit 10 and displayed there on a display screen. This image can make it easier for a user to control the air vehicle or can allow precise positioning. Furthermore, a movement or a path along which the targeting unit 10 moves can be derived by image processing of an image sequence.

Figure 6:
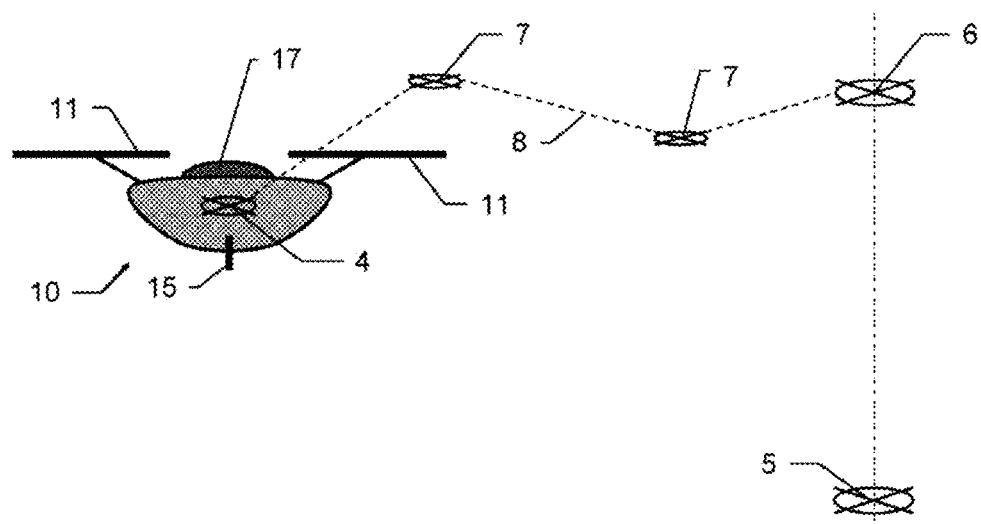
FIG. 6 shows a movement path according to the invention for a targeting unit according to the invention.

FIG. 6 shows the air vehicle 10 (targeting unit) according to the invention from FIG. 5, wherein furthermore a positioning sequence for reaching a setpoint position 6 using the targeting unit 10 is shown. The targeting unit 10 is located here at an instantaneous actual position 4. Depending on the actual position 4 and a known position of the target point 5, the targeting unit 10 can be positionable in a setpoint position 6. A control of the movement of the targeting unit 10 up to this setpoint position 6 can be performed by means of the rotors 11, wherein for this purpose signals are received by the receiver module 17. The marking unit 15 is again provided for marking the target point 5.

In addition, further waypoints 7 can be predetermined and/or determined from a terrain model, in particular automatically, along which waypoints the targeting unit 10 can move. In addition, the terrain model can have items of information about the terrain, for example, terrain vegetation and/or positions and dimensions of structures, from a data bank having items of geodetic information. Therefore, a path 8, in particular a flight path, for a locomotion of the targeting unit 10 can be defined in such a manner that already known obstructions in the movement environment can be taken into consideration and driven or flown around.

FIG. 7 shows a determination according to the invention of the alignment of the marking direction 14a, 14b, which is represented by the laser beams 16a, 16b, of the marking unit 15 of the targeting unit 10. The targeting unit 10 is already positioned in this case—controlled by the signals received using the receiver module 17 and by the rotors 11—floating in a setpoint position 6. If the coordinates of the position of the target point 5a, 5b are known in three dimensions, the alignment angles for the marking direction 14a, 14b can be calculated from the setpoint position 6 and the alignment of the targeting unit 10 and the target point position 5a, 5b. In contrast, if only the horizontal coordinates of the target point 5a, 5b are known, from this item of information an unambiguous determination of the alignment of the marking direction 14a, 14b cannot be performed. In this case, a digital terrain model can additionally be used for the calculation. For this purpose, terrain surfaces 60a, 60b can be intersected with a vertical axis 60 defining the horizontal position and the target point positions 5a, 5b can be ascertained from the intersection points. An alignment of the laser radiation 16a, 16b can then be performed in consideration of the target point positions 5a, 5b. Alternatively or additionally to the checking of the alignment, a distance to the marked target point 5a, 5b can be measured by means of a distance measuring device, which is arranged on the targeting unit 10. From the known position of the targeting unit 10 and the measured distance in the case of known alignment of the marking direction 14a, 14b, a correct marking of the target point 5a, 5b can thus be checked. Furthermore, if only the horizontal position of the target point is known, a search can be performed, in particular an automatically iterative search, of the target point position 5a, 5b to be marked. The target point 5a, 5b or the vertical position of the point 5a, 5b can be determined by an intersection of the vertically extending axis 61 and the laser radiation 16a, 16b in consideration of a calculated setpoint distance, which is determinable as a function of an angle between marking direction 14a, 14b and vertical axis 61, from targeting unit 10 to target point 5a, 5b.

It is obvious that these illustrated figures only schematically illustrate possible exemplary embodiments. The various approaches can also be combined according to the invention with one another and with systems and methods for marking objects or target points from the prior art.

What is claimed is:

1. A geodetic marking system for marking a known target point having an automotive, unmanned, remote controllable air vehicle and having a geodetic position determination arrangement for the external actual position determination of the air vehicle, wherein the air vehicle is implemented in such a manner that the air vehicle is positionable at least temporarily substantially fixed in position, wherein:

the air vehicle carries a marking unit for marking the target point; and the marking system has a control unit and the control unit is configured in such a manner that:
  as a function of the external actual position, which is determinable continuously, the air vehicle is positionable in an automatically controlled manner in a defined setpoint position relative to the target point position; and
  in consideration of the actual position, the setpoint position, and a defined marking direction from the marking unit to the target point, the marking unit is controllable for marking the target point such that the target point can be marked in the defined marking direction with geodetic precision.

2. The marking system as claimed in claim 1, wherein the marking unit is modularly removable.

3. The marking system as claimed in claim 1, wherein as the function of the external actual position, which is determinable continuously, and a known target point position of the target point, the air vehicle is positionable in the automatically controlled manner in a defined setpoint position in a defined tolerance region around the setpoint position relative to the target point position continuously.

4. The marking system as claimed in claim 1, wherein:
  the position determination arrangement has at least one transmitter unit for emitting positioning signals; and
  the air vehicle is implemented in such a manner that the positioning signals are receivable.

5. The marking system as claimed in claim 4, wherein the air vehicle is implemented in such a manner that the positioning signals are receivable by means of a GNSS antenna, and the actual position of the air vehicle is determinable from the positioning signals.

6. The marking system as claimed in claim 4, wherein:
  the transmitter unit is implemented as a GNSS transmitter, a GNSS satellite, a GPS, GLONASS, or Galileo satellite, and the positioning signals are embodied by GNSS signals or
  the transmitter unit has a pseudo-satellite module and the positioning signals are embodied by pseudo-satellite signals.

7. The marking system as claimed in claim 4, wherein:
  the position determination arrangement has a GNSS reference station for emitting GNSS correction signals; and
  the air vehicle is implemented in such a manner that the GNSS correction signals are receivable and the actual position of the air vehicle is determinable from the received GNSS signals and the GNSS correction signals.

8. The marking system as claimed claim 1, wherein:
  the air vehicle has a reflector;
  the position determination arrangement has a geodetic surveying device, including:
    one targeting apparatus including a telescopic sight, wherein the targeting apparatus is pivotable by a motor with respect to a base of the surveying device to change the alignment thereof, and includes:
      one emission unit which defines an optical target axis; and
      one radiation source for the emission of an optical measuring beam for the distance measurement in parallel coaxially to the optical target axis;
    angle measuring functionality for the high-precision acquisition of the alignment of the target axis; and
    analysis means for data storage and control of the alignment of the targeting apparatus; and
  the measuring beam can be aligned on the reflector, such that the actual position of the air vehicle is determinable.

9. The marking system as claimed claim 1, wherein:
  a signal is transmittable to the air vehicle, the signal is embodied by a radio signal, a signal modulated on a laser beam, or an electronic signal, and has:
    an item of position information, wherein the item of position information can be converted into control data in a first processing unit assigned to the air vehicle; or
    the control data, wherein the control data can be ascertained from the item of position information by means of a second processing unit, which is assigned to the surveying device.

10. The marking system as claimed in claim 1, wherein:
  the air vehicle has a sensor unit for determining an alignment and/or the actual position of the air vehicle; and/or
  the air vehicle has a component which specifies the alignment of the air vehicle and the marking system has an acquisition device for acquiring and/or targeting the component and for determining the alignment of the air vehicle from the location and arrangement of the component; and/or
  the air vehicle is positionable at least temporarily floating substantially horizontally fixed in position; and/or
  the marking system has a remote control unit for controlling the air vehicle.

11. The marking system as claimed in claim 1, wherein:
  the air vehicle has at least one of: an inclination sensor, a magnetometer, an acceleration sensor, a yaw rate sensor, and a velocity sensor.

12. The marking system as claimed in claim 11, wherein:
  the marking system has a regulating functionality, wherein upon execution of the regulating functionality, controlled by the control unit during a marking time window, the actual position of the air vehicle is continuously determined:
    by means of interaction of the geodetic surveying device with the reflector; and/or
    by means of the sensor unit;
  and the air vehicle is held stable based thereon in such a manner that the target point is continuously marked with geodetic precision during the entire marking time window by means of the marking unit.

13. The marking system as claimed in claim 12, wherein:
  the positioning of the air vehicle is regulated in such a manner that the air vehicle is present in the setpoint position during the entire marking time window; and/or
  the marking direction is continuously adapted; and/or
  an error output is performed in the event of at least temporary non-occurrence of the marking of the target point.

14. An automotive, unmanned, remote controllable air vehicle for use in a marking system as claimed in claim 1, wherein:
  the air vehicle is implemented in such a manner that the air vehicle is positionable at least temporarily substantially fixed in position;
  items of position information for determining an external actual position of the air vehicle and for generating control data and/or the control data are transmittable directly to the air vehicle, wherein
  the air vehicle carries a marking unit for marking a target point, wherein the marking unit is embodied as modularly removable; and
  the control data are embodied in such a manner that:
    as a function of the external actual position, which is continuously determinable and a known target point position of the target point, the air vehicle is continuously positionable in a defined setpoint position in a defined tolerance region around the setpoint position relative to the target point position in an automatically controlled manner; and in consideration of the actual position, the setpoint position, and a defined marking direction from the marking unit to the target point, the marking unit is controllable to mark the target point such that the target point can be marked in the defined marking direction with geodetic precision.

15. The air vehicle as claimed in claim 14 for use in a marking system, wherein the air vehicle has a receiver for positioning signals including a GNSS antenna and a processing unit for determining an actual position of the air vehicle from the positioning signals;

the positioning signals are embodied by GNSS signals, wherein the GNSS signals are represented by GPS, GLONASS or Galileo signals, pseudo-satellite signals, and/or GNSS correction signals and the actual position is determinable from the GNSS signals and/or the GNSS-like signals in consideration of the GNSS correction signals; and/or the air vehicle has a reflector.

16. The air vehicle as claimed in claim 14, wherein:

the air vehicle has a sensor unit including an inclination sensor, a magnetometer, an acceleration sensor, a yaw rate sensor, and/or a velocity sensor; and/or the air vehicle has a sensor for distance measurement to objects using radar; and/or the air vehicle has an optical acquisition unit including a camera for acquiring an image, wherein the image has the target point; and/or the air vehicle, for the defined alignment, independently parallel alignment to the vertical direction, of the marking direction, has a gimbal mount and/or alignment means for the marking unit, wherein the marking unit is pivotable in three axes; and/or the marking unit has a beam source for the emission of optically visible radiation and the beam source is arranged in such a manner that an emission direction of the optical radiation extends coaxially to the marking direction; and/or the air vehicle has an input unit including a keyboard, touch-sensitive display screen, and/or data interface, for inputting information and/or control commands including the target point position; and/or the air vehicle has an output unit including a display screen for outputting information including the image acquired by the camera; and/or the air vehicle has a remote control unit for controlling the air vehicle and the remote control unit has a display screen for displaying information and/or the image acquired by the camera.

17. A marking arrangement for marking a known target point and for use in a marking system as claimed in claim 1 having a remote controllable marking unit and a geodetic position determination arrangement for the external position determination of the marking unit, wherein an external actual position of the marking unit is continuously determinable continuously by means of the position determination arrangement, wherein:

the marking arrangement has a control unit, wherein the control unit is configured in such a manner that:

as a function of the external actual position, which is continuously determinable and a known target point position of the target point, the marking unit is continuously positionable in a defined setpoint position and in a defined tolerance region around the setpoint position relative to the target point position; and in consideration of the actual position, the setpoint position, and a defined marking direction from the marking unit to the target point, the marking unit is controllable such that the target point can be marked in the defined marking direction with geodetic precision.

18. The marking arrangement for marking a known target point as claimed in claim 17, wherein:

the position determination arrangement has at least one transmitter unit for emitting positioning signals; and the marking unit is implemented in such a manner that the positioning signals are receivable, in particular by means of a GNSS antenna, and the actual position of the marking unit is determinable from the positioning signals.

19. The marking arrangement for marking a known target point as claimed in claim 18, wherein:

the transmitter unit is implemented as a GNSS transmitter, a GNSS satellite, a GPS, GLONASS, or Galileo satellite, and the positioning signals are embodied by GNSS signals; or the transmitter unit has a pseudo-satellite module and the positioning signals are embodied by pseudo-satellite signals;

the position determination arrangement has a GNSS reference station for emitting GNSS correction signals; and the marking unit is implemented in such a manner that the GNSS correction signals are receivable and the actual position of the marking unit is determinable from the received GNSS signals and the GNSS correction signals, and/or the position determination arrangement has a geodetic surveying device, in particular a theodolite or total station, wherein the position of the marking unit is specified with high precision in space by a reflector, including:

one targeting apparatus including a telescopic sight, wherein the targeting apparatus is pivotable by a motor in relation to a base of the surveying device to change the alignment thereof and has at least:

one emission unit which defines an optical target axis; and one radiation source for the emission of an optical measuring beam coaxially to the optical target axis for the distance measurement;

angle measuring functionality for the high-precision acquisition of the alignment of the target axis; and analysis means for data storage and control of the alignment of the targeting apparatus, and wherein:

the measuring beam can be aligned on the reflector, such that the actual position of the marking unit is determinable; and/or the marking unit has a data interface embodied by radio module, Bluetooth interface, infrared interface, and/or com-port, for control and/or information exchange with an automotive, unmanned, remote controllable air vehicle.

20. The marking system as claimed claim 1, wherein:

the air vehicle has a camera for acquiring and/or targeting the component and for determining the alignment of the air vehicle from the location and arrangement of the component.

21. The marking system as claimed claim 1, wherein:

the air vehicle is positionable at least temporarily floating substantially horizontally fixed, wherein an effect on the positioning by external influences including air flow, pressure variation, and/or temperature variation, can be compensated for in the vertical direction.

22. The marking system as claimed claim 1, wherein:
the marking system has a remote control unit for controlling the air vehicle, wherein the remote control unit has a display screen for displaying information.

23. A method for controlling a marking of a known target point, which is performed with geodetic precision, using an automotive, unmanned, remote controllable air vehicle, wherein an external actual position of the air vehicle is determined, wherein:
the air vehicle carries a marking unit, which is removable for marking the target point; and
as a function of the external actual position which is determined continuously and a known target point position of the target point, the air vehicle is positioned in an automatically controlled manner in a defined setpoint position relative to the target point position; and
in consideration of the actual position, the setpoint position, and a defined marking direction from the marking unit to the target point, the marking unit is controlled to mark the target point, such that the target point is marked in the defined marking direction with geodetic precision.

24. The method for controlling the marking as claimed in claim 23, wherein:
the external actual position of the air vehicle is determined continuously;
the marking unit is removable modularly;
the function of the external actual position is determined continuously; and
the air vehicle is positioned in the automatically controlled manner in the defined setpoint position in a defined tolerance region around the setpoint position relative to the target point position continuously.

25. The method for controlling the marking as claimed in claim 23, wherein in the scope of the method, positioning signals are received by the air vehicle and the external actual position.

26. The method for controlling the marking as claimed in claim 25, wherein an alignment of the air vehicle, is determined from the positioning signals.

27. The method for controlling the marking as claimed in claim 26, wherein the positioning signals are embodied by GNSS signals, pseudo-satellite signals, and/or GNSS correction signals and the actual position is determined from the GNSS signals and/or the GNSS-like signals.

28. The method for controlling the marking as claimed in claim 27, wherein in consideration of the GNSS correction signals, and/or a measuring beam is reflected on the air vehicle side and the external actual position is determined by means of the reflected measuring beam.

29. The method for controlling the marking as claimed in claim 23, wherein:
the alignment of the air vehicle in the pitch, roll, and yaw directions, and/or a distance to an obstruction, are determined.

30. The method for controlling the marking as claimed in claim 23, wherein the marking unit is gimbal mounted and/or the air vehicle has alignment means for the defined alignment of the marking direction, wherein the marking unit is pivoted in two axes, in particular in three axes.

31. The method for controlling the marking as claimed in claim 30, wherein the marking unit is pivoted in three axes.

32. The method for controlling the marking as claimed in claim 23, wherein in the scope of a regulation during a marking time window, the actual position of the air vehicle is continuously determined:
by means of the measuring beam reflected on the air vehicle side; or
by means of a sensor unit for determining an alignment and/or the actual position of the air vehicle.

33. The method for controlling the marking as claimed in claim 32, wherein:
the air vehicle is held stable based thereon in such a manner that the target point is continuously marked with geodetic precision during the entire marking time window by means of the marking unit;
the positioning of the air vehicle is regulated in such a manner that the air vehicle is present in the setpoint position during the entire marking time window; and/or
the marking direction is continuously adapted; and/or
an error output is performed in the event of at least temporary non-occurrence of the marking of the target point; and/or
in the scope of the method, a path is defined by waypoints, wherein the air vehicle is moved along the path, in particular wherein an optimization of a path course is performed, in particular automatically, and/or the path has the target point and/or the setpoint position, and/or marking of the position of the waypoints as intermediate target points is performed continuously along the path; and/or
items of information and/or control commands including the target point position are input into the air vehicle; and/or
items of information including the acquired image are output on a display screen.

34. A computer program product, which is stored on a non-transitory tangible machine-readable carrier having program code for carrying out the method as claimed in claim 23.

35. The method for controlling the marking as claimed in claim 23, wherein an image having the target point is acquired.

36. The method for controlling the marking as claimed in claim 23, wherein the marking of the target point is performed using optically visible radiation and a radiation direction of the radiation is coaxial to the marking direction.

37. The method for controlling the marking as claimed in claim 23, wherein the marking direction of the marking unit is aligned in parallel independently to the vertical direction and/or in a defined manner relative to the alignment of the air vehicle.

* * * * *